United States Patent
Nix

(10) Patent No.: US 9,117,123 B2
(45) Date of Patent: Aug. 25, 2015

(54) VEHICULAR REAR VIEW CAMERA DISPLAY SYSTEM WITH LIFECHECK FUNCTION

(75) Inventor: Axel Nix, Birmingham, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 296 days.

(21) Appl. No.: 13/176,095

(22) Filed: Jul. 5, 2011

(65) Prior Publication Data

US 2012/0002051 A1      Jan. 5, 2012

Related U.S. Application Data

(60) Provisional application No. 61/361,465, filed on Jul. 5, 2010.

(51) Int. Cl.
   *H04N 7/18*    (2006.01)
   *G06K 9/00*   (2006.01)
   *G06T 7/20*   (2006.01)

(52) U.S. Cl.
   CPC .......... *G06K 9/00845* (2013.01); *G06T 7/2053* (2013.01); *B60R 2300/8006* (2013.01); *G06T 2200/28* (2013.01); *G06T 2207/10016* (2013.01); *G06T 2207/30252* (2013.01)

(58) Field of Classification Search
   CPC ....... H04N 7/18; G06K 9/00845; G06K 1/00; G06K 1/00335; G06T 7/20; G06T 2200/28; G06T 2207/10016; G06T 2207/30252; B60R 2300/8006
   USPC .......... 324/543; 340/541, 441, 435; 375/240.22; 701/41; 345/519; 348/148
   See application file for complete search history.

(56) References Cited

U.S. PATENT DOCUMENTS

| | | | |
|---|---|---|---|
| 2,632,040 | A | 3/1953 | Rabinow |
| 2,827,594 | A | 3/1958 | Rabinow |
| 3,349,394 | A | 10/1967 | Carver |
| 3,601,614 | A | 8/1971 | Platzer |
| 3,612,666 | A | 10/1971 | Rabinow |
| 3,665,224 | A | 5/1972 | Kelsey |
| 3,680,951 | A | 8/1972 | Jordan |
| 3,689,695 | A | 9/1972 | Rosenfield et al. |
| 3,708,231 | A | 1/1973 | Walters |
| 3,746,430 | A | 7/1973 | Brean |

(Continued)

FOREIGN PATENT DOCUMENTS

| | | |
|---|---|---|
| EP | 0426503 | 5/1991 |
| EP | 0492591 | 7/1992 |

(Continued)

OTHER PUBLICATIONS

G. Wang, D. Renshaw, P.B. Denyer and M. Lu, CMOS Video Cameras, article, 1991, 4 pages, University of Edinburgh, UK.

(Continued)

*Primary Examiner* — Richard Torrente
*Assistant Examiner* — Joseph Suh
(74) *Attorney, Agent, or Firm* — Gardner, Linn, Burkhart & Flory, LLP

(57) ABSTRACT

A vehicular display system having a camera for producing a video signal and a display device for displaying the video signal. The display device includes an integrity check to detect a defective video signal and alert the driver if a defective video signal has been detected.

16 Claims, 1 Drawing Sheet

(56) References Cited

U.S. PATENT DOCUMENTS

| | | |
|---|---|---|
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,958,225 A * | 9/1990 | Bi et al. .................. 375/240.22 |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |

(56) References Cited

U.S. PATENT DOCUMENTS

| | | |
|---|---|---|
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |

(56) References Cited

U.S. PATENT DOCUMENTS

| | | |
|---|---|---|
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,970,081 B1 * | 11/2005 | Cheng ............ 340/541 |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,459,664 B2 | 12/2008 | Schofield et al. |
| 7,526,103 B2 | 4/2009 | Schofield et al. |
| 7,561,181 B2 | 7/2009 | Schofield et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,683,934 B2 * | 3/2010 | Montminy et al. ...... 348/207.99 |
| 7,720,580 B2 | 5/2010 | Higgins-Luthman |
| 7,914,187 B2 | 3/2011 | Higgins-Luthman et al. |
| 2002/0015153 A1 | 2/2002 | Downs |
| 2002/0044065 A1 | 4/2002 | Quist et al. |
| 2002/0105597 A1 * | 8/2002 | Janko et al. .................. 348/700 |
| 2002/0113873 A1 | 8/2002 | Williams |
| 2002/0159270 A1 | 10/2002 | Lynam et al. |
| 2003/0048274 A1 * | 3/2003 | Yamagishi et al. ........... 345/519 |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2005/0270036 A1 * | 12/2005 | Allan et al. ................... 324/543 |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0055521 A1 * | 3/2006 | Blanco et al. ................. 340/441 |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Widmann et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0126869 A1 * | 6/2007 | Montminy et al. ........... 348/143 |
| 2007/0176080 A1 | 8/2007 | Schofield et al. |
| 2007/0222274 A1 * | 9/2007 | de Lauzun .................... 324/770 |
| 2007/0282491 A1 * | 12/2007 | Cox et al. ........................ 701/3 |
| 2008/0022154 A1 * | 1/2008 | Endou .............................. 714/30 |
| 2008/0042812 A1 * | 2/2008 | Dunsmoir et al. ............ 340/435 |
| 2008/0180529 A1 | 7/2008 | Taylor et al. |
| 2008/0240616 A1 * | 10/2008 | Haering et al. ................ 382/294 |
| 2009/0113509 A1 | 4/2009 | Tseng et al. |
| 2009/0228174 A1 * | 9/2009 | Takagi et al. .................. 701/41 |
| 2010/0045797 A1 | 2/2010 | Schofield et al. |
| 2010/0245595 A1 * | 9/2010 | Waehner ....................... 348/192 |
| 2011/0149448 A1 * | 6/2011 | Hori et al. ........................ 361/47 |
| 2012/0002051 A1 * | 1/2012 | Nix ............................... 348/148 |

FOREIGN PATENT DOCUMENTS

| | | |
|---|---|---|
| EP | 0788947 | 8/1997 |
| FR | 2641237 | 7/1990 |
| JP | 59114139 | 7/1984 |
| JP | 6079889 | 5/1985 |
| JP | 6080953 | 5/1985 |
| JP | 6272245 | 5/1987 |
| JP | 62131837 | 6/1987 |
| JP | 6414700 | 1/1989 |
| JP | 1141137 | 6/1989 |
| JP | 4114587 | 4/1992 |
| JP | 5213113 | 8/1993 |
| JP | 6227318 | 8/1994 |

(56) References Cited

FOREIGN PATENT DOCUMENTS

| JP | 06267304 | 9/1994 |
|----|----------|--------|
| JP | 06276524 | 9/1994 |
| JP | 06295601 | 10/1994 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| WO | WO8605147 | 9/1986 |
| WO | WO9419212 | 9/1994 |
| WO | WO9638319 | 12/1996 |
| WO | WO9735743 | 10/1997 |
| WO | WO2007111984 | 10/2007 |
| WO | WO2009073054 | 6/2009 |

OTHER PUBLICATIONS

Dana H. Ballard and Christopher M. Brown, Computer Vision, Prentice-Hall, Englewood Cliffs, New Jersey, 5 pages, 1982.
Tokimaru et al., "CMOS Rear-View TV System with CCD Camera", National Technical Report vol. 34, No. 3, pp. 329-336, Jun. 1988 (Japan).

* cited by examiner

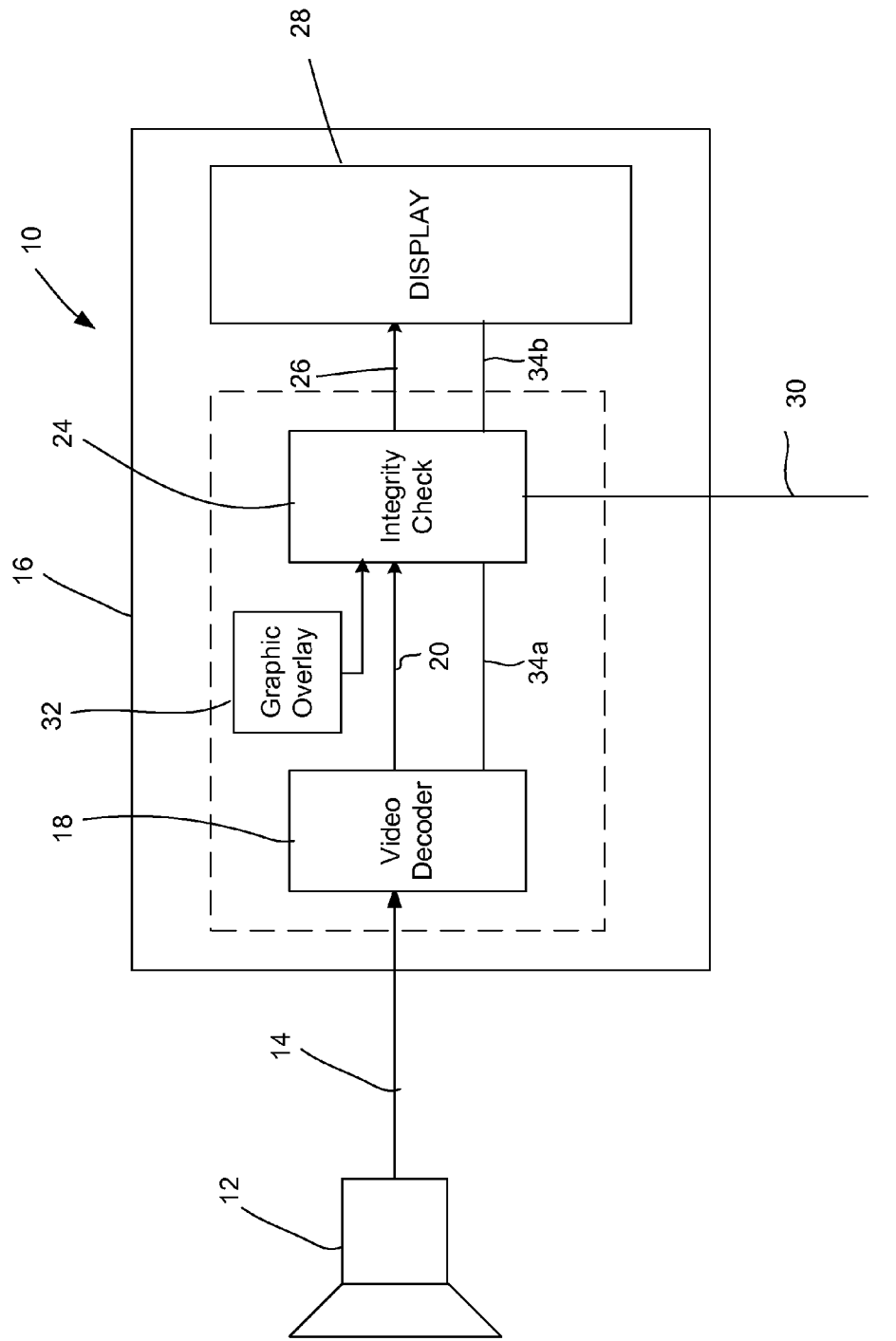

VEHICULAR REAR VIEW CAMERA DISPLAY SYSTEM WITH LIFECHECK FUNCTION

This application claims the benefits of U.S. Provisional Application Ser. No. 61/361,465, filed Jul. 5, 2010, which is hereby incorporated by reference in its entirety.

FIELD OF THE INVENTION

The invention relates to the art of vehicular rear view cameras.

BACKGROUND OF THE INVENTION

Vehicular rear view cameras are commercially deployed on numerous vehicular platforms. Such cameras are typically mounted in or adjacent to the rear bumper of a vehicle and have a rearward facing field of view. The cameras are typically connected to a display monitor in the vehicle to allow the driver to see what is behind the vehicle, particularly when the vehicle is shifted into reverse. The display monitor may be mounted in the center console, embedded or incorporated into the interior rear view mirror, or placed in some other location in the cabin visible to the driver.

The vehicular rear view display system provides many safety benefits as it allows the driver a good field of view to see what is behind the vehicle and thus avoid tragic accidents such as running over children when backing out of one's driveway.

The vehicular rear view display system has been so useful that it has now become ubiquitous and often the primary source of information for drivers when reversing. For example, many drivers rely solely on the rear view camera to squeeze into a tight parking spot or check to see if there are any children, toys or other objects behind the vehicle.

Therein lies a problem.

SUMMARY OF THE INVENTION

More specifically, because the vehicular rear view display system is often the primary source of information for the driver backing up, any error in the display system such as a frozen screen could result in calamity. In order to reduce the risk of such an event, the invention provides a life check subsystem to ensure that the video information provided to the display is not compromised.

According to one aspect of the invention, a vehicular display system is provided which includes a camera for producing a video signal and a display device for displaying the video signal. The display device includes an integrity check to detect a defective video signal and alert the driver if a defective video signal has been detected.

According to another aspect of the invention, a vehicular display system is provided which includes a display monitor; a camera for mounting on the vehicle to generate a video signal; and a video decoder receiving the video signal and providing pixel data for view on the display monitor. An integrity check circuit receives at least one of the video signal and the pixel data, and vehicle speed data. The integrity check circuit reviews at least one of the video signal and pixel data in order to ascertain a change therein beyond a threshold when the vehicle speed is not zero. In the event insufficient change is detected the integrity check circuit initiates an error indication intended for the driver for view on the display.

BRIEF DESCRIPTION OF THE DRAWINGS

The foregoing and other aspects of the invention will be more readily appreciated having reference to the drawings, wherein:

FIG. 1 is a system block diagram of a vehicular rear view display system according to one embodiment of the invention.

DETAILED DESCRIPTION OF THE INVENTION

FIG. 1 shows a vehicular rear view display system 10 having a rear view camera 12 preferably mounted to the rear bumper of a vehicle, although other locations at the rear of the vehicle may be utilized as alternative attachment points. In the embodiment described herein, the rear view camera 12 includes a lens assembly and an imager that provides an analog video signal 14 to a head unit 16 that is preferably mounted in a protected location in the vehicle. The head unit 16 includes a video decoder 18, such as an NTSC or PAL decoder, as known in the art per se, which intercepts the analog video signal 14 and provides pixel data on output line(s) 20. In alternative embodiments, the camera imager may provide digital pixel data directly, omitting a separate video decoder (in which case video decoder can be considered to be integrated with the camera imager). Alternatively, the digital pixel data may be in the form of a compressed bit stream where not all pixels are directly represented in which case the video decoder 18 in the head unit 16 decompresses the bit stream to provide the pixel data.

The pixel data line 20 is received by an integrity check functional block or circuit 24. The purpose of block 24 is to ensure that the pixel data provided by the rear view camera 12 and video decoder 18 is "valid" data, suitable for display. If so, then the pixel data received on line 20 is output via one or more lines 26 connected to a display monitor 28 viewable by the driver. If the pixel data received on line 20 is invalid, then the integrity check block 24 provides an appropriate output on line 26, such as a blacked out screen, or access and display a warning graphic (e.g., STOP, or ERROR) as may be retrieved by a graphic overlay memory 32. In this manner, it is possible to reduce the danger of inaccurate data from being displayed on the display monitor 30, such as a frozen screen.

The integrity check block 24 may perform one or more validity checks.

First, the integrity check block 24 preferably measures the impedance of the line carrying video signal 14. If the measured impedance of the video signal line varies beyond a certain a range, the integrity check block 24 will assume that the line has a break in it or is otherwise compromised. A suitable error message may be displayed on the display monitor 28, or an error code may be provided to the vehicular central control unit (not shown) via the vehicular local area network 30 such as CAN or LIN.

Utilizing the input provided by the vehicular local area network 30, the integrity check block 24 preferably receives a signal from the vehicular central control unit indicating when the vehicle transmission is placed in reverse and the speed of the vehicle. When the vehicle is in motion, the view received by the rear view camera 12 is expected to change, and hence the pixel data is expected to change. Accordingly, when the vehicle speed is greater than zero the integrity check block 24 looks for an absence in change in the pixel data received on line 20. More particularly, the integrity check block 24 may examine one or more diagonal lines of pixels to ascertain if a minimum of a predetermined number of pixels have changed over the course of time. Additionally or alternatively, one or more horizontal lines, vertical lines or one or more sub-regions (such as areas closest to the vehicle) may be tested for change in the corresponding pixels. The magnitude of the change may also be a factor, and chrominance and luminance information may be separately considered to ensure that one or more of these quantities change a sufficient amount so as to avoid false alarm situations resulting from thermal, electromagnetic or other noise. Likewise, the rate of change in the pixel may also be a factor in ascertaining the validity of the pixel data based on the speed of the vehicle, as the greater the speed of the vehicle, the greater the expected change.

Change of a pixel may be calculated by subtracting the pixel value of a previous frame n−1 from the value of the same pixel of current frame n. Change may also be detected by comparing a histogram of a previous frame n−1 with the histogram of current frame n. To qualify a video stream as being valid the amount of change between any two images may have to exceed a minimum threshold. The minimum threshold may be selected as a static value. Beneficially, the minimum threshold may also be variably selected based on the vehicle speed, so that a video stream with low change from frame to frame is classified as valid while the vehicle is stopped, however larger frame to frame change is necessary to indicate a valid video stream while the vehicle is moving.

The integrity check block 24 may also communicate with one or more of the video decoder 18 and the display via 30 via control lines 34a or 34b. In particular, the integrity check block 24 may institute a heartbeat check, where for example, the integrity check block 24 periodically sends out a signal with a counter to the video decoder 18 and/or display 28 and the component(s) sends back a signal incrementing the counter. The failure to receive the incremented signal within a predetermined period of time may indicate a failure of the component, prompting a suitable response such as blanking out the display 28 or generating an error message.

In some embodiments the display 28 may operate off of a pixel memory, where the display periodically provides a pixel output corresponding to the contents of the corresponding pixel memory location. In such systems a risk exists that the display will display the contents of the pixel memory, even where there has been no change in quite some time. The pixel memory may be located in the video decoder 18, in the display unit 28 itself, or in some other location. The integrity check block 24 may communicate directly with the pixel memory via the control lines 34a or 34b to conduct memory checks as may be provided by the memory circuits as known in the art per se.

For redundancy purposes, a second integrity check block (not shown) may be provided in the display system 10 which receives the same inputs as the primary integrity check block 24 and provides parallel outputs. The second integrity check block may monitor the inputs and responses of the primary integrity check block 24 and signal a message to the central vehicle controller in the event the primary integrity check block 24 malfunctions.

Those skilled in the art will understand that the video decoder 18, integrity check block 24 and graphic overlay memory 32 may be provided on a single integrated circuit, for example, in a "system on chip" microcontroller, or provided utilizing multiple integrated circuits. In such embodiments integrity check block 24 may be a software routine running on the microcontroller. Similarly, those skilled in the art will appreciate that the integrity check circuit may operate directly on the analog or digital video signal prior to it being converted to pixel data by the video decoder.

While the foregoing has described a particular embodiment(s) of the invention, it will be appreciated that modifications and variations may be made to the detailed embodiment(s) described herein without departing from the spirit of the invention.

The invention claimed is:

1. A vehicular display system, comprising:
a display monitor;
a camera mounted at a rear of a vehicle equipped with the vehicular display system, wherein the camera has a field of view rearward of the equipped vehicle and is operable to capture image data and to generate a video signal indicative of the captured image data;
a controller receiving an input indicative of the video signal and, responsive thereto, providing video information for displaying video images on the display monitor;
wherein, responsive to the input and responsive to vehicle speed data of the equipped vehicle being indicative of the equipped vehicle moving rearwardly at a speed greater than zero, the controller is operable to perform an integrity check to ensure that video information provided to the display monitor is not compromised;
wherein the integrity check determines that video information provided to the display monitor is compromised via a determination, when the equipped vehicle is moving in reverse, that video information provided to the display monitor comprises a frozen image;
wherein, responsive to the controller determining that video information provided to the display monitor comprises a frozen image, the controller generates an alert to a driver of the equipped vehicle; and
wherein a threshold level of change in captured image data at which the video information is determined to comprise a frozen image varies with the vehicle speed.

2. A system according to claim 1, wherein the alert is one of a blacked out screen or a graphic overlay on the display monitor.

3. A system according to claim 1, wherein the camera provides an analog video signal to a video encoder and the video decoder provides digital image data to the controller.

4. A system according to claim 1, wherein, when the equipped vehicle is moving in reverse, and responsive to a determination of a change in captured image data being less than a threshold level of change, the controller determines that the video information provided to the display monitor comprises a frozen image.

5. A system according to claim 1, wherein the controller conducts a heartbeat handshake with at least one other functional component and generates the alert in the event the at least one other functional component does not respond within a predetermined period of time.

6. A system according to claim 1, wherein the controller determines an impedance of a video signal line carrying the video signal and generates the alert in the event the measured impedance deviates by a predetermined amount.

7. A system according to claim 1 including a pixel memory, and wherein the controller periodically queries the pixel memory to ascertain its continued functionality.

8. A system according to claim 1, wherein the alert comprises a visual alert for the driver for view on the display monitor.

9. A vehicular display system comprising:
a camera disposed at a rear of a vehicle equipped with said vehicular display system and having a field of view rearward of the equipped vehicle and producing a video signal;

a display device for displaying images derived from the video signal;

a controller, wherein, responsive to a vehicle speed input being indicative of the equipped vehicle moving rearwardly at a speed greater than zero, the controller performs an integrity check to detect a defective video signal, and wherein, responsive to detection by the controller of a defective video signal, the controller alerts a driver of the equipped vehicle that a defective video signal has been detected, wherein the integrity check detects a defective video signal via a determination, when the vehicle is moving rearwardly, that video information provided to the display device comprises a frozen image;

wherein the controller is operable to determine when captured image data vary less than a threshold amount when the vehicle is moving rearwardly, and wherein, responsive to a determination of less than the threshold amount of variation in captured image data when the vehicle is moving rearwardly, the controller alerts the driver that a defective video signal has been detected; and wherein the threshold amount varies with the speed of the equipped vehicle.

10. A vehicular display system of claim 9, wherein said controller is operable to determine when captured image data vary less than a threshold amount when the vehicle is moving rearwardly.

11. A vehicular display system of claim 9, wherein the controller is operable to determine a threshold impedance level in a video line carrying the video signal, and wherein, responsive to a determination of the threshold impedance level, the controller alerts the driver that a defective video signal has been detected.

12. A vehicular display system of claim 9, wherein the controller alerts the driver via a visual alert displayed on the display device.

13. A vehicular display system comprising:

a camera disposed at a vehicle equipped with said vehicular display system, the camera having an exterior field of view rearward of the equipped vehicle and capturing image data;

a display device for displaying images responsive to a video signal, wherein the video signal is derived from image data captured by the camera;

a controller, wherein the controller, responsive to a vehicle speed signal being indicative of the equipped vehicle moving rearwardly at a speed greater than zero, is operable to determine a compromised video signal and to alert a driver if a compromised video signal has been determined;

wherein the controller determines a compromised video signal responsive to a determination, when the vehicle is moving rearwardly, that the video signal comprises a frozen image;

wherein the video signal is determined to comprise a frozen image responsive to a determination that captured image data in at least two frames of captured image data vary less than a threshold amount when the vehicle is moving rearwardly; and wherein the threshold amount varies with the speed of the equipped vehicle.

14. A vehicular display system of claim 13, wherein the camera is disposed at a rear of the vehicle and wherein said controller is operable to determine when captured image data in at least two frames of captured image data vary less than a threshold amount when the vehicle is moving rearwardly.

15. A vehicular display system of claim 13, wherein the controller is operable to determine an impedance level in a video line carrying the video signal, and wherein, responsive at least in part to a determination that the impedance level varies beyond a threshold impedance level range, the controller alerts the driver that a compromised video signal has been determined.

16. A vehicular display system of claim 13, wherein the controller alerts the driver via a visual alert displayed on the display device.

* * * * *